United States Patent
Lindahl et al.

(10) Patent No.: US 7,900,847 B2
(45) Date of Patent: Mar. 8, 2011

(54) BARCODES WITH GRAPHICAL ELEMENTS

(75) Inventors: Kim O. Lindahl, Golden Valley, MN (US); Kelly Kuhn-Wallace, Minneapolis, MN (US); David Sha, Minneapolis, MN (US); John J. Kaiser, St. Paul, MN (US); Ellen A. Boldt, Minnetonka, MN (US); Eric B. Erickson, Minneapolis, MN (US); Vicki L. Domka, Becker, MN (US); John J. Butcher, Chanhassen, MN (US); Bonnie Eggleston, Apple Valley, MN (US); Ted C. Halbur, Lino Lakes, MN (US)

(73) Assignee: Target Brands, Inc., Minneapolis, MN (US)

( * ) Notice: Subject to any disclaimer, the term of this patent is extended or adjusted under 35 U.S.C. 154(b) by 576 days.

(21) Appl. No.: 12/016,612

(22) Filed: Jan. 18, 2008

(65) Prior Publication Data

US 2008/0197192 A1 Aug. 21, 2008

Related U.S. Application Data

(60) Provisional application No. 60/881,029, filed on Jan. 18, 2007.

(51) Int. Cl.
*G06K 19/06* (2006.01)
(52) U.S. Cl. .......................................... 235/494; 235/385
(58) Field of Classification Search .................. 235/494, 235/385
See application file for complete search history.

(56) References Cited

U.S. PATENT DOCUMENTS

| | | | | |
|---|---|---|---|---|
| 3,309,667 | A | 3/1967 | Feissel et al. | 340/146.3 |
| 4,590,366 | A | 5/1986 | Rothfjell | 235/494 |
| 4,627,819 | A | 12/1986 | Burrows | 434/337 |
| 5,145,212 | A | 9/1992 | Mallik | 283/86 |
| 5,900,954 | A | 5/1999 | Katz et al. | 359/2 |
| 6,357,799 | B1 | 3/2002 | Shibata et al. | 283/91 |
| 6,550,685 | B1 | 4/2003 | Kindberg | 235/494 |
| 6,655,579 | B1 | 12/2003 | Delman et al. | 235/375 |
| 6,739,627 | B2 | 5/2004 | Cobben et al. | 283/91 |
| 6,797,317 | B2 | 9/2004 | Ferro | 427/148 |
| 7,014,123 | B2 | 3/2006 | Lapstun | 235/494 |
| 2004/0103974 | A1 | 6/2004 | Majumdar et al. | 156/110.1 |
| 2005/0225080 | A1 | 10/2005 | Wicker | 283/117 |
| 2006/0086811 | A1 | 4/2006 | Yoshida et al. | 235/494 |

OTHER PUBLICATIONS http://img316.imageshack.us/my.php?image=etiqueta8rb.jpg, Nov. 16, 2006, 1 page.

(Continued)

*Primary Examiner* — Daniel A Hess
(74) *Attorney, Agent, or Firm* — Nixon & Vanderhye P.C.

(57) ABSTRACT

Barcodes are provided that convey images to help consumers and/or to help identify information about the origin of an article. The images conveyed by the barcodes may be associated with a merchant, a department, an event, a season, a theme or a product, for example. The barcodes may be placed on any number of articles including purchaser receipts, gift receipts, marketing receipt coupons, paper coupons, electronic coupons, rewards cards, gift cards, registry printouts, and products/packaging, for example. Under some embodiments, the barcodes help consumers to associate articles with a particular merchant or department. Under other embodiments, the barcodes help consumers to distinguish purchaser receipts from gift receipts. In some embodiments, the barcodes are generated dynamically by altering font-based barcodes to convey the image.

14 Claims, 10 Drawing Sheets

OTHER PUBLICATIONS

Nikkei Design, Bar-code of unique design appears (with Babel Fish Translation), http://nd.nikkeibp.co.jp/nd/news/contents/801.shtml, Jan. 31, 2005.

Jet City Orange, Bar Code Artwork, http://www.jetcity_orange.com/barcodes/art/, Nov. 16, 2008, 5 pages. BarCodeArt., http://www.barcodeart.com/art/art.html, Nov. 16, 2006, 1 page.

Coca-Cola, Christmas Bottle, http://www.jbond76207.com/foreign_cocacola_bottle_list.htm, 2003, 1 page.

BevNet, Bevboard, http://www.bevnet.com/bevboard-general/27762-check-coke-ad.html, posted Jul. 2005, 3 pages.

Bar Code Revolution, "Why Has the Barcode Never Changed," http://www.barcoderevolution.com/about/, Nov. 16, 2006, 1 page.

Bar Code Revolution, Gallery, http://www.barcoderevolution.com/gallery/, Nov. 16, 2006, 1 page.

Bar Code Revolution, "Designed and Tested for Total Reliability," http://www.barcoderevolution.com/technicalinfo/, Nov. 16, 2006, 1 page.

WebJapan, "Barcode Art," http://web-Japan.org/trends/business/bus061110.html, Nov. 10, 2006, 2 pages.

BARCODES WITH GRAPHICAL ELEMENTS

REFERENCE TO RELATED APPLICATIONS

This application claims priority from U.S. Provisional Application 60/881,029 filed on Jan. 18, 2007.

BACKGROUND

Barcodes are graphical patterns of black rectangles separated by white spaces. In one dimensional barcodes, the widths of the black rectangles and white spaces are used to encode alpha-numeric values.

In the retail industry, barcodes are found on products, coupon offers, and sales receipts. At a point-of-sale terminal, the barcode on a product is scanned to determine the widths of the rectangles and spaces. This information is then decoded to generate a numeric value that can be applied against a database to retrieve a price and description for the product. Similarly, coupon barcodes are scanned to produce a numeric value that represents the savings offer associated with the coupon and in some cases to produce a numeric value that represents the item that is to be purchased with the coupon. For example, one portion of the barcode will indicate that the coupon is for bananas, and another portion of the barcode will indicate that the coupon provides fifty-cents off. The barcode on a receipt identifies the transaction associated with the receipt and allows the merchant to quickly locate information about the transaction simply by scanning the barcode on the receipt.

Current barcodes are limited because they only provide encoded information. As a result, they are of little use to consumers and at times occupy valuable space that could otherwise be used to communicate with consumers. In addition, because the barcodes only provide encoded information, fraudulent consumers have placed fake barcodes on packages so that a less expensive product will be identified at the point-of-sale terminal based on the fake barcode.

The discussion above is merely provided for general background information and is not intended to be used as an aid in determining the scope of the claimed subject matter.

SUMMARY

Barcodes that convey images in addition to encoding information are used on articles such as products, receipts, registries, gift cards and coupons, for example, to determine the origin of the articles. Under one embodiment, design elements are added to barcodes on receipts to detect the origin of the receipt and to help consumers distinguish purchaser receipts from gift receipts. In another embodiment, design elements are added to barcodes on coupons to convey information to consumers as to where the coupons can be redeemed and/or what items are to be purchased with the coupons. In further embodiments, design elements are added to barcodes on products to help identify whether a merchant sold the product and to determine whether a barcode is fake. To allow multiple users within an organization to utilize design elements with any desired barcode, a style-sheet of acceptable design elements that have been tested with a number of different barcodes is published within the organization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein use barcodes that convey images to help consumers and to help identify information about the origin of an article. The images conveyed by the barcodes may be associated with a merchant, a department, an event, a season, a theme or a product, for example. The barcodes may be placed on any number of articles including purchaser receipts, gift receipts, marketing receipt coupons, paper coupons, electronic coupons, rewards cards, gift cards, registry printouts, and products/packaging, for example. Under some embodiments, the barcodes help consumers to associate articles with a particular merchant or department. Under other embodiments, the barcodes help consumers to distinguish purchaser receipts from gift receipts. In some embodiments, the barcodes are generated dynamically by altering font-based barcodes to convey the image. In other embodiments, graphical elements are added around barcodes such that the same graphical elements may be used with a large number of possible barcodes to convey the same image.

Figure 1:
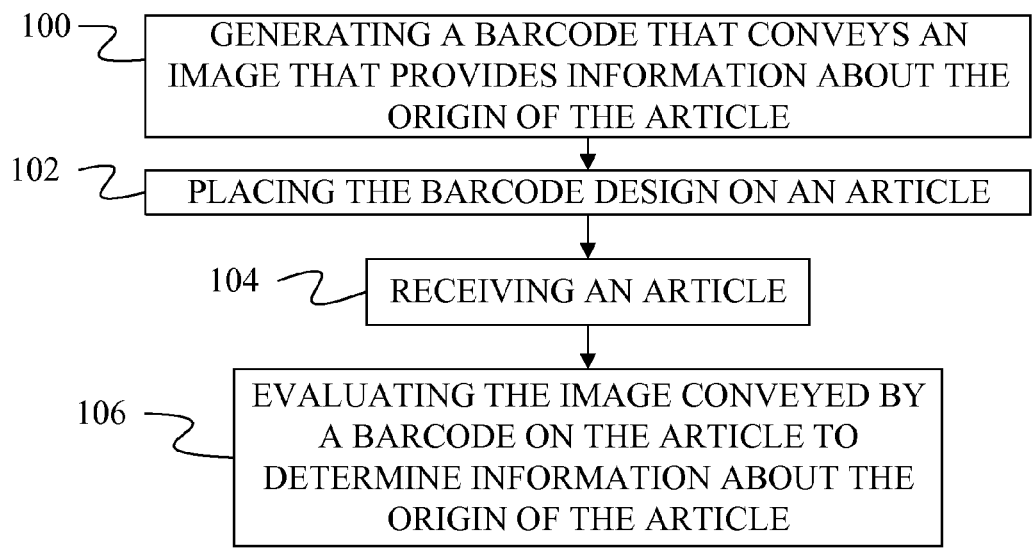
FIG. 1 is a flow diagram of a method of determining the origin of an article using barcode designs under one embodiment.
Figure 2:
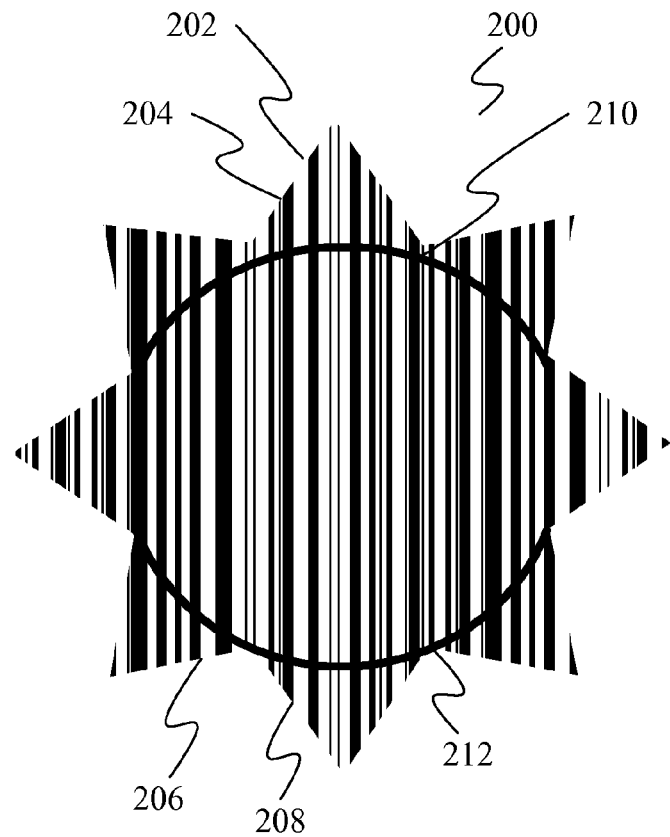
FIG. 2 is an example of a barcode design under one embodiment.

FIG. 1 provides a flow diagram of a general method for using a barcode with graphical elements to obtain information about the origin of an article. In step 100, a barcode with a graphical element that conveys an image that provides information about the origin of the article is generated. FIG. 2 provides an example of such a barcode.

In FIG. 2, a graphical pattern 200 consists of dark elements, such as elements 202 and 204, that are separated by horizontal spaces, such as spaces 206 and 208. The widths of the dark elements and the widths of the spaces extend horizontally in FIG. 2, while the heights of the dark elements extend vertically. The widths of the dark elements and the widths of the spaces encode information that is designed to be read by a barcode scanner. The graphical pattern as a whole also conveys an image to a person other than a block barcode. For example, in FIG. 2, the graphical pattern conveys the image of the sun. In addition to the dark elements that encode the information, additional dark elements, such as curves 210 and 212, can be provided to further convey the image.

Barcode images of some embodiments are generated by modifying elements produced by a font-based barcode by modifying descriptions of curves and line segments that define an outline barcode font. These modifications can include adding additional curves and/or line segments to the font description, changing the starting point/ending point of one or more curves and or line-segments in the font description, or changing the shape of one or more curves in the font description. After modifying the font description for the barcode, the barcode can be generated by passing the font description through a rasterizer, which identifies pixels that are to be dark based on the font description and the printer or display where the barcode will appear. The identified pixels form a bitmap image that is then transferred to the printer or display.

In other embodiments, the descriptions of the curves and lines of the barcode fonts are not modified in order to modify the barcode elements. Instead, the barcode fonts are used to generate a bitmap that represents a standard block barcode and then the elements of this bitmap are modified by applying the bitmap to a mask. The mask allows some pixels of the barcode to pass unchanged while removing other pixels to define the final image of the barcode. For example, in FIG. 2, the mask would remove all pixels that are outside of the outer perimeter of the sun. In some embodiments, the mask may also add additional pixels to the barcode or outside of the barcode to help convey the image. In further embodiments, the barcode may be drawn with the aid of a computer and stored as image data in a file. Such image data may consist of a bitmap or a compressed bitmap formed through a known compression algorithm. In further embodiments, the standard block barcode is not altered but additional design elements are added around the block barcode.

The barcode may be generated and stored long before it is to be printed. Alternatively, the barcode may be generated dynamically just prior to being displayed or printed. Such dynamic generation is useful when a large number of different barcodes will be used. For example, dynamic generation is useful when barcodes are used to encode a transaction identifier on a receipt because every receipt receives its own transaction identifier and thus its own barcode. Under some embodiments, a large number of different barcodes are dynamically generated so that all of the barcodes convey the same image even though they encode different information.

Graphical elements added to the barcode must be positioned carefully so as to not interfere with scanning of the barcode. In particular, vertical elements that are in line with the barcode can be misinterpreted as being part of the barcode. Under one embodiment of the present invention, vertical elements are kept a minimum distance away from the beginning and ending of the barcode. For example, under one embodiment, vertical elements are prevented from being within ¾ of an inch of the beginning of the barcode and are prevented from being within ¾ of an inch of the end of the barcode.

After the barcode image has been generated, it is placed on an article at step 102. This can involve printing the barcode on a purchaser receipt, a gift receipt, a marketing receipt coupon, a gift card, a rewards card, a registry printout, a coupon, a product/package, or a sticker that may be placed on an article, to name several examples. In addition, placing the barcode on an article may include placing computer-readable data that represents the barcode in a file or message that represents an electronic coupon or offer.

At step 104, an article such as a receipt, coupon, rewards card or product package, to name a few examples, is received at a merchant. At step 106, the image conveyed by the visual design elements of the barcode and graphical elements around the barcode are evaluated to determine information about the origin of the article. For example, the image conveyed by a barcode and associated graphical elements on a receipt or coupon may be examined to determine if the image is one of a set of images associated with a particular merchant in order to determine if the receipt or coupon is authentic. The image conveyed by a barcode and associated graphical elements on a product may be used to determine if the barcode is the correct or authentic barcode for the product. This can help to determine if a fake barcode has been placed on the product. The image conveyed by a barcode and associated graphical elements on a product may also be used to determine whether the product came from a particular merchant. This can help detect product returns to the wrong merchant.

Figure 3:
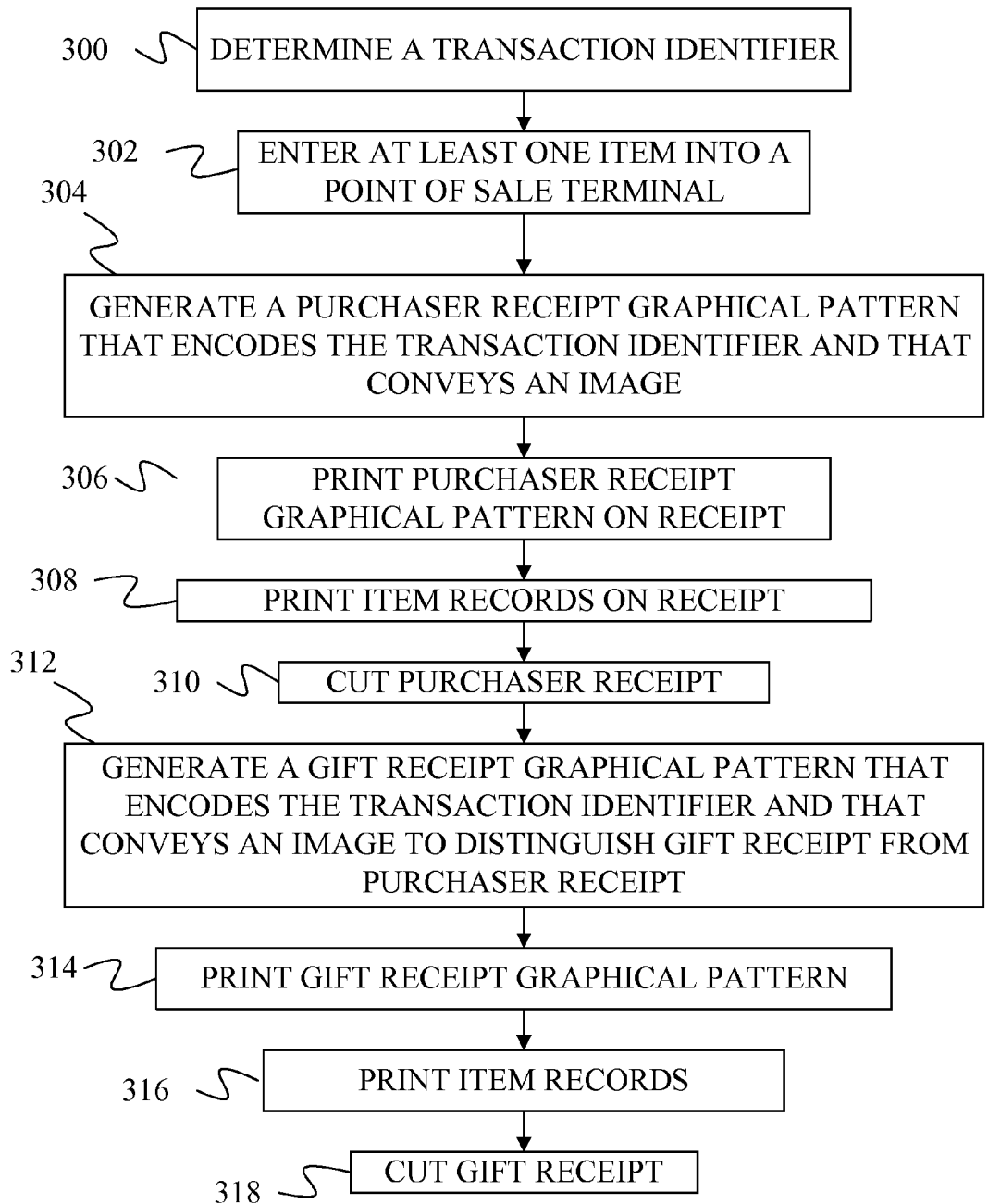
FIG. 3 is a flow diagram for printing barcode designs on receipts under one embodiment.

FIG. 3 provides a flow diagram of a method for generating transaction-related documents consisting of a purchaser receipt and a gift receipt under one embodiment. In step 300, a transaction identifier for the transaction is determined. Under one embodiment, the transaction identifier is a multi-digit number that uniquely identifies the transaction in a merchant database. At step 302, at least one item that is being purchased is entered into a point of sale terminal. Typically, this is done by scanning the barcode of the item. After all of the items that are being purchased in this transaction have been entered into the point of sale terminal, a purchaser receipt graphical pattern, such as a barcode and associated graphical elements, is generated that encodes the transaction identifier and that conveys a visual image. Examples of such visual images include icons associated with the merchant and the name of the merchant, and images associated with a season, event, theme, department, and product.

The purchaser receipt graphical pattern is then printed on the purchaser receipt at step 306. Item records that contain information about the items that were involved in this transaction are then printed on the purchaser receipt at step 308. Note that the order of printing shown in FIG. 3 is only an example and in other embodiments the barcode may be printed after the information about the items. At step 310, the purchaser receipt is at least partially cut from the paper roll that it is printed on.

Figure 4:
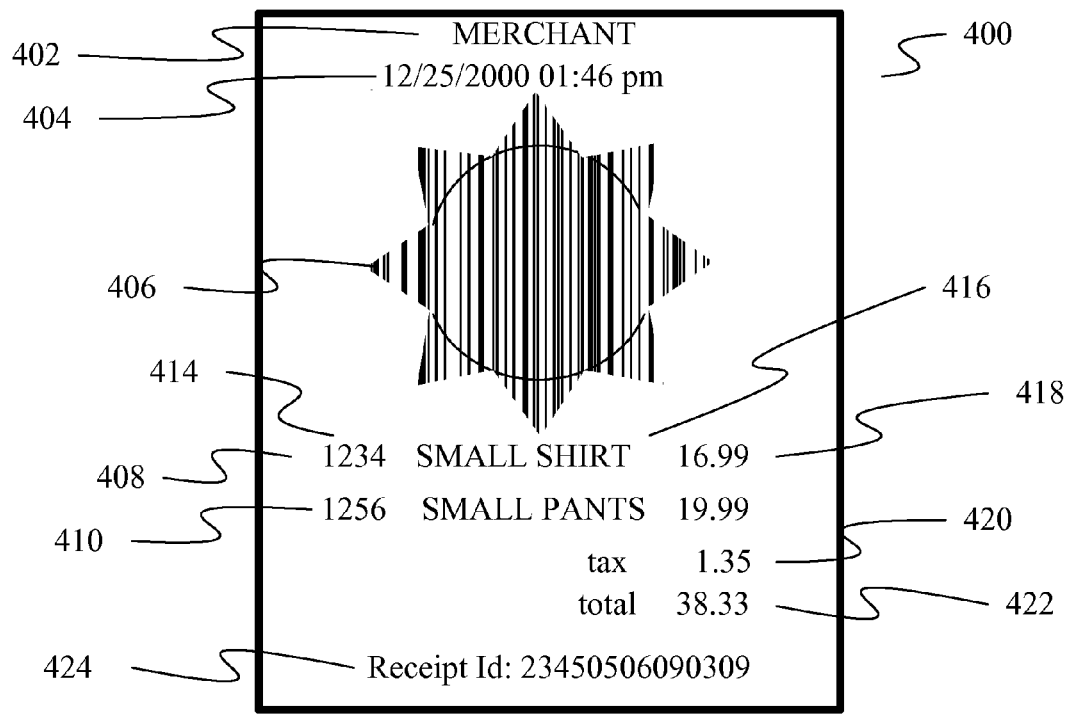
FIG. 4 is an example of a barcode design on a purchaser receipt under one embodiment.

FIG. 4 provides an example of a purchaser receipt 400 that can be produced through steps 300-310 of FIG. 3. Purchaser receipt 400 includes a merchant logo area 402, a date/time area 404 and graphical pattern 406. Merchant logo area 402 can include one or more icons or words that identify the merchant. Date/time area 404 records the date and time of the transaction. Graphical pattern 406 encodes the transaction identifier and conveys an image that is associated with the merchant. In FIG. 4, graphical pattern 406 conveys the image of the sun. The transaction identifier is also printed in numeric form in a transaction identifier area 424 that is at the bottom of purchaser receipt 400, away from graphical pattern 406. Purchaser receipt 400 also includes a list of item records 408, and 410, which each include an internal identification field 414, a description field 416 and a price field 418. Internal identification field 414 provides a value that internally identifies the item in the merchant database. Description field 416 provides a short text description of the item. Price field 418 indicates the price of the item. Purchaser receipt 400 also includes a tax field 420 that indicates the tax generated by the transaction and a total field 422 that indicates the total due and paid for the transaction.

Returning to FIG. 3, at step 312, a gift receipt graphical pattern, such as a barcode and associated graphical elements, is generated that encodes the transaction identifier. Under one embodiment, the gift receipt graphical pattern encodes the same transaction identifier as the purchaser receipt graphical pattern. The gift receipt graphical pattern also conveys a visual image that distinguishes the gift receipt from the purchaser receipt to make it easier for consumers to know which part of the receipt is the purchaser receipt and which part is the gift receipt. This can include conveying a different visual image that is also associated with the merchant or conveying a visual image that is associated with gifts such as packages and bows, for example.

At step 314, the gift receipt graphical pattern is printed on the gift receipt. Item records that provide a second form of information about the items that are being purchased is then printed on the gift receipt at step 316. This form of information typically includes the price in an encoded form so that it is not apparent from the gift receipt. At step 318, the gift receipt is at least partially cut from the paper roll.

Figure 5:
FIG. 5 is an example of a barcode design on a gift receipt under one embodiment.

FIG. 5 provides an example of a gift receipt 500. Gift receipt 500 includes merchant logo area 502, gift text area 504 and gift receipt graphical pattern 506. Merchant logo area 502 identifies the merchant with an icon and/or text. Gift text area 504 identifies the receipt as a gift receipt. Gift receipt graphical pattern 506 encodes the transaction identifier, which is provided in numeric form in field 518, and also includes graphical elements that convey the image of a gift box to make it easier for the purchaser to distinguish the gift receipt from the purchaser receipt. In particular, gift receipt graphical pattern 506 includes barcode elements 526, which appear to form two sides to a box, top outline 528 and bottom outline 529, which form the top and bottom of the box, respectively, and bow 530. Gift receipt 500 also includes item records 508 and 510, which include internal identifier field 512, text description 514, and encoded price 516.

Figure 6:
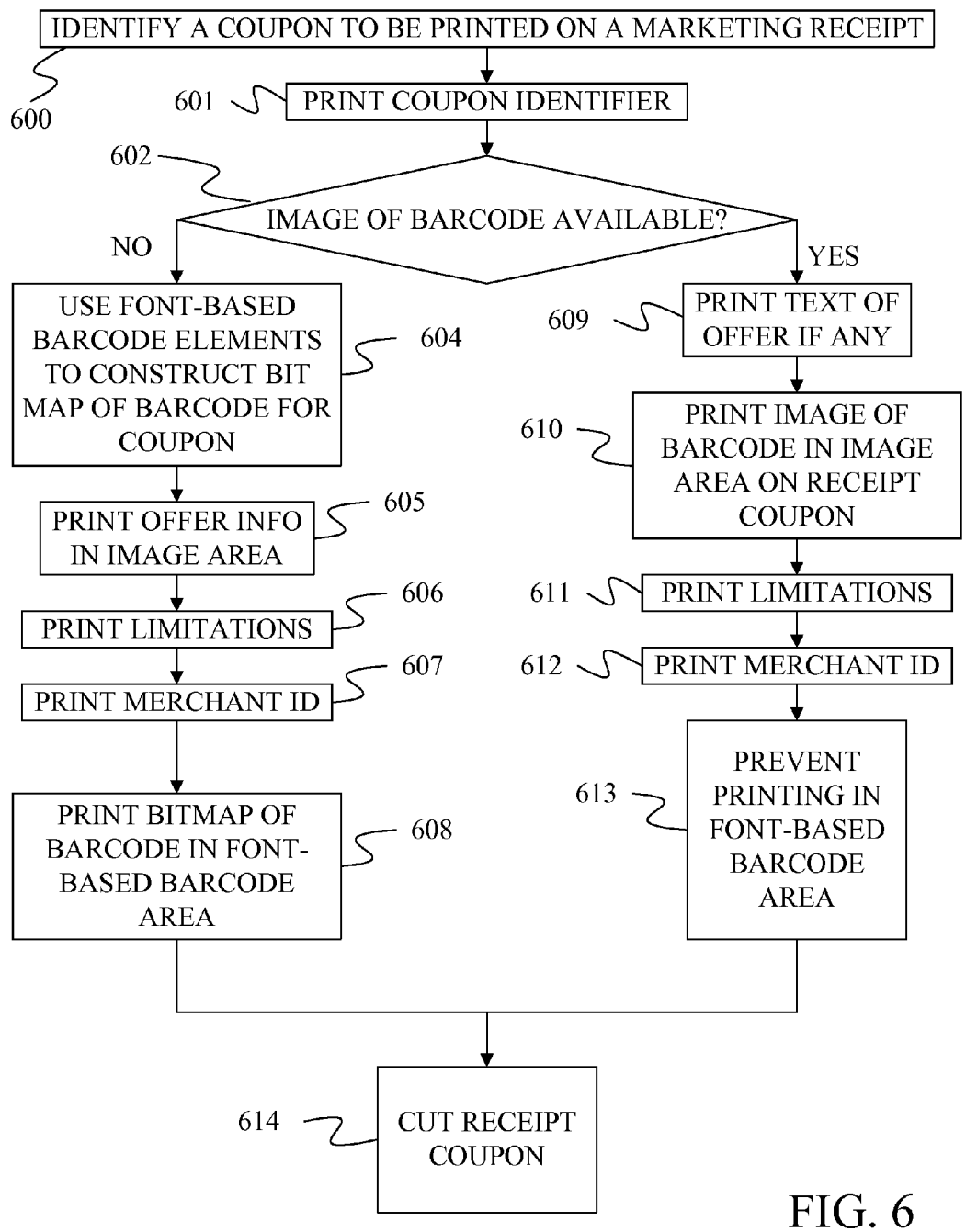
FIG. 6 is a flow diagram of a method of printing a receipt marketing coupon under one embodiment.

Barcodes and associated graphical elements that convey images may also be applied to coupons printed on marketing receipts. Under one embodiment, such coupons are printed on a receipt marketing coupon chit that prints at the end of a receipt after the purchaser receipt and/or gift receipt. Under one embodiment, such receipt marketing coupons include an image area and a font-based barcode area. FIG. 6 provides a flow diagram for printing receipt marketing coupons with barcodes and associated graphical elements that convey an image by utilizing the image area and the font-based barcode area.

In step 600 of FIG. 6, a coupon to be printed on a marketing receipt is identified. At step 601, a coupon identifier, such as the word "COUPON", for example, is printed on the marketing receipt. At step 602, a determination is made as to whether image data that describes a barcode and associated graphical elements is available for the coupon. Such image data is distinguished from font-based data in that the image data is not described as a set of curves and line segments as is font-based data. Instead, such image data represents a bitmap of the barcode and associated graphical elements. Such image data may be compressed if desired using any known compression algorithm.

At step 604, if image data for a barcode and associated graphical elements is not stored for this coupon, font-based barcode elements that encode an offer identifier are used to construct a bitmap of a standard block barcode for the coupon. At step 605, offer information that describes the coupon offer is printed in the image area. At step 606, any limitations for the coupon, such as "Limit 1 per customer", for example, are printed and at step 607, a merchant identifier such as the merchant's name or the merchant's logo is printed. At step 608, the bitmap of the barcode is printed in the font-based barcode area of the receipt coupon.

Figure 7:
FIG. 7 is an example of a receipt marketing coupon under one embodiment.

FIG. 7 provides an example of a receipt marketing coupon 700 in which an image of a barcode and associated graphical elements was not available at step 602. Receipt marketing coupon 700 includes a coupon identifier 701, image area 702, limitations area 704, merchant identifier 706 and font-based barcode area 708. Coupon area 701 identifies this chit as a coupon. Limitations area 704 describes the limitations placed on the coupon. Merchant identifier 706 identifies the merchant where this coupon may be redeemed. Image area 702 describes the offer associated with the coupon. Font-based barcode area 708 includes a standard block barcode that encodes the offer identifier for coupon 700.

Returning to FIG. 6, if there is image data that represents a barcode and associated graphical elements for the coupon at step 602, offer text is printed on the marketing receipt at step 609 that partially describes the offer associated with the coupon. At step 610, the image data for the barcode and associated graphical elements is used to print the barcode and associated graphical elements in the image area of the marketing receipt coupon. Limitations on the offer are printed at step 611 and a merchant identifier is printed at step 612. At step 613, the font-based barcode area is turned off so that the font-based barcode is prevented from being printed on the marketing receipt. After step 613, or step 608, the receipt coupon chit is cut from the paper roll at step 614.

Figure 8:
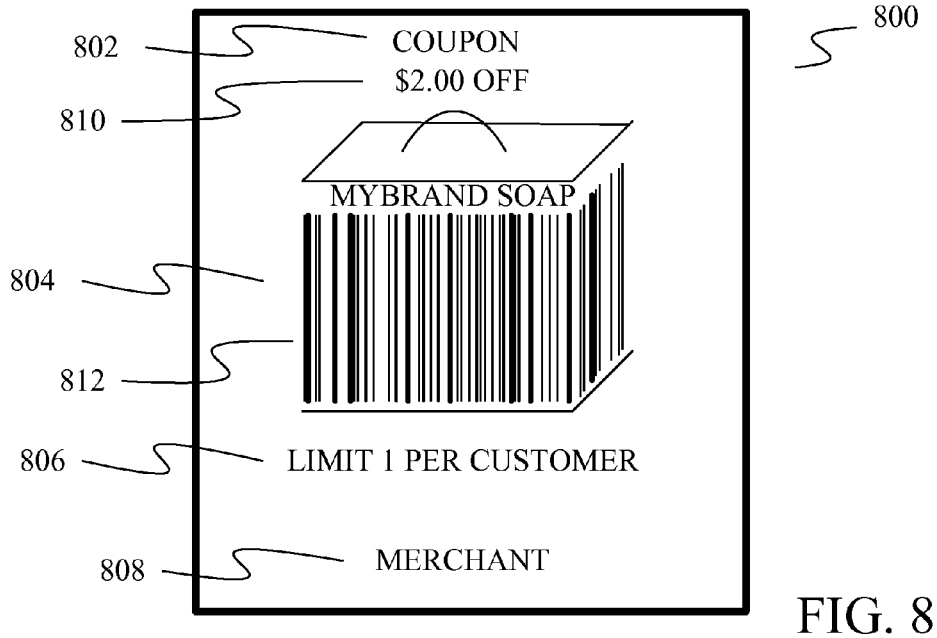
FIG. 8 is an example of a receipt marketing coupon with a barcode design element under one embodiment.

FIG. 8 provides an example of a marketing receipt coupon chit 800 in which image data for a barcode and associated graphical elements was available at step 602. Marketing receipt coupon 800 includes coupon identifier 802, image area 804, limitations area 806 and merchant identifier area 808. Coupon identifier area 802, limitations area 806 and merchant identifier area 808 are identical to coupon identifier area 701, limitations area 704 and merchant identifier area 706 of FIG. 7. Image area 804 includes text information 810 about the offer and a barcode and associated graphical elements 812 that conveys an image, in this case an image of a detergent box, and that encodes an offer identifier associated with marketing receipt coupon 800. Note that receipt marketing coupon 800 does not include a font-based barcode area since the barcode is incorporated into image area 804.

By conveying an image with the barcode in the receipt marketing coupon, it is believed that the image will attract consumers' attention and help them to differentiate the marketing receipt coupon from the other portions of the receipt. This in turn will help with redemption of the coupon, thereby driving further sales.

Barcodes and associated graphical elements that convey images may also be applied to coupons that are distributed through circulars, direct mail, magazines, newspapers, e-mails and internet websites. In these coupons, the amount of space available to describe the offer and identify the merchant where the offer may be redeemed is limited because the size of the coupon is limited. As a result, placing a standard block barcode on a coupon occupies valuable space on the coupon but does not convey information to the consumer. In particular, current barcodes do not help the consumer to know what the offer on the coupon is related to or the location where the coupon may be redeemed.

Figure 9:
FIG. 9 is an example of a coupon with a barcode design that conveys an image associated with a merchant under one embodiment.

FIG. 9 provides an example of a coupon 900. Coupon 900 may be printed on any form of paper or cardstock and in some embodiments may be printed on plastic. The paper and cardstock may form part of a larger sheet of paper or be adhered to a piece of paper.

Coupon 900 includes an offer barcode 902 and an item barcode 904. Offer barcode 902 encodes an offer identifier and also conveys an image associated with a merchant where the coupon may be redeemed. Item barcode 904 is a block barcode that encodes an item identifier for the item that is to be purchased with the coupon. A numeric item code 906 and a numeric offer code 908 provide numeric representations of the information encoded by barcodes 904 and 902, respectively. A text description of the offer 910 is also provided on the coupon.

By providing barcode 902 in a shape that conveys an image associated with a merchant, coupon 900 makes it easier for consumers to associate the coupon with a particular merchant so that they can bring the coupon to the correct merchant for redemption.

Figure 10:
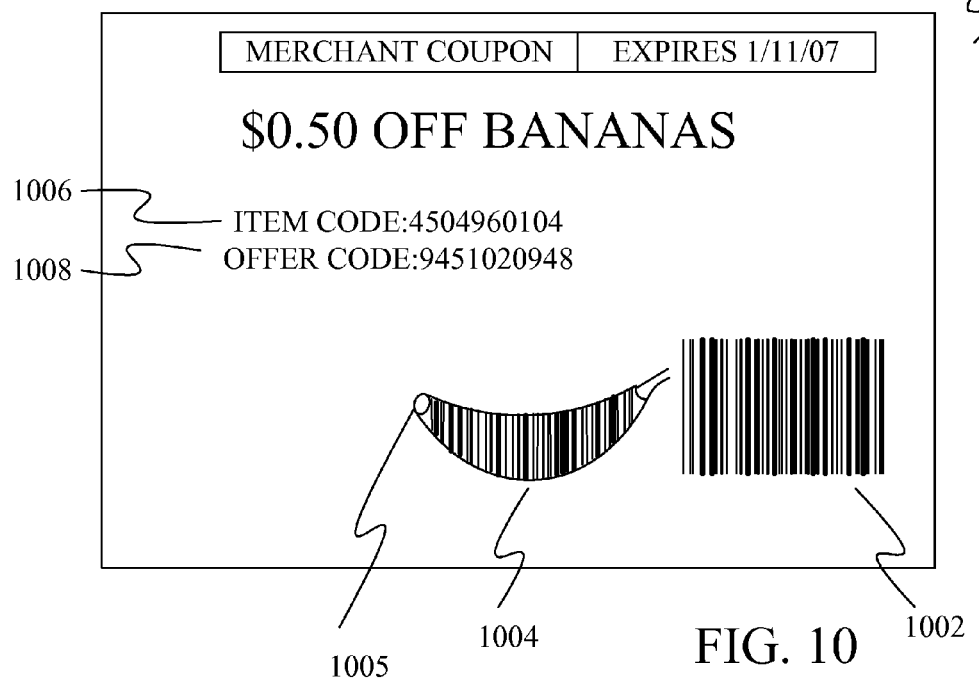
FIG. 10 is an example of a coupon with a barcode design that conveys an image associated with a product under one embodiment.

FIG. 10 provides an example of a coupon 1000 that includes an item barcode 1004 and an offer barcode 1002. Item barcode 1004 encodes an item identifier and is shaped and is provided with additional graphical elements 1005 to convey an image of the item that is to be purchased with the coupon, in this case bananas. Offer barcode 1002 encodes an offer identifier and is a standard block barcode. Coupon 1000 also includes a numeric item code 1006 and a numeric offer code 1008 that provide a human readable form of the information encoded in shaped barcode 1004 and standard block barcode 1002, respectively. By using shaped barcode 1004, coupon 1000 is able to quickly convey to the user what is to be purchased with the coupon. In addition, the shaped barcode may draw the attention of a consumer so that they are more likely to redeem the coupon.

Figure 11:
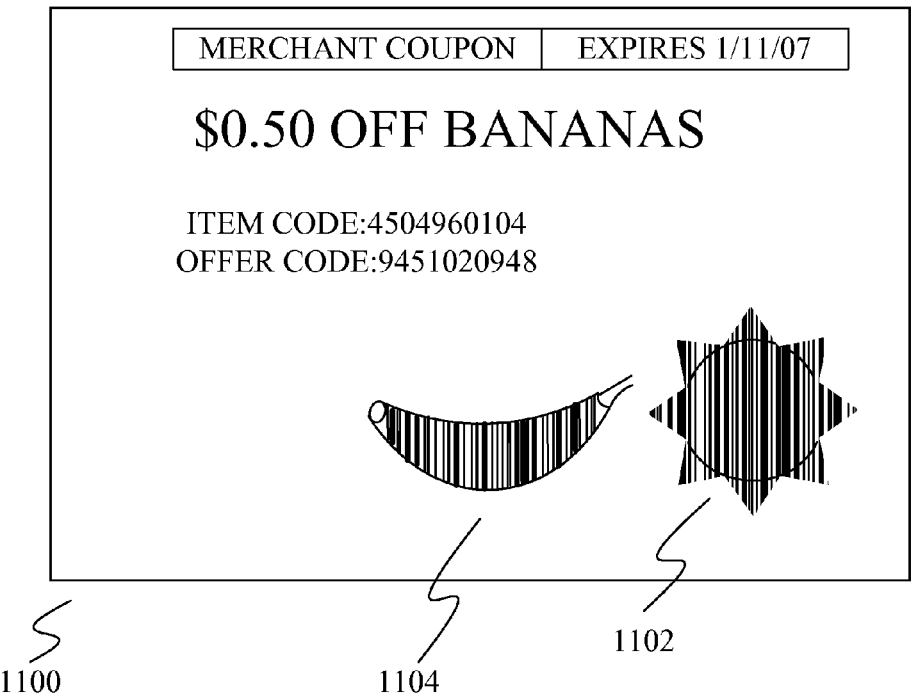
FIG. 11 is an example of a coupon with a barcode design that conveys an image associated with a product and a barcode design that conveys an image associated with a merchant under one embodiment.

FIG. 11 provides an example of a coupon 1100 in which an offer barcode 1102 and an item barcode 1104 are both shaped. In particular, offer barcode 1102 is shaped to provide an indication of a location where the coupon can be redeemed, such as a merchant or a department within a merchant. Item barcode 1104 is shaped to convey the image of the item to be purchased with the coupon. Using both shaped barcodes, coupon 1100 quickly conveys to the consumer the items that are being offered in the coupon and the location where the coupon may be redeemed.

Figure 12:
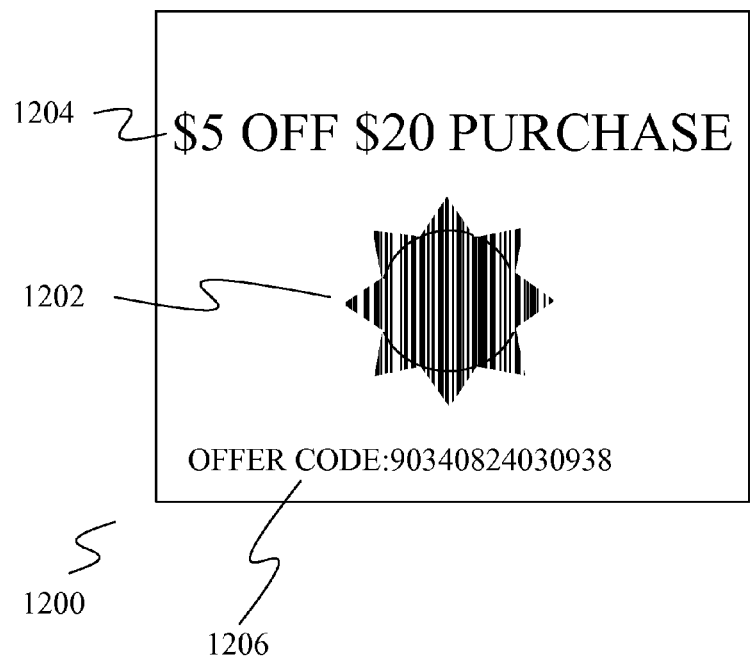
FIG. 12 is an example of a discount offer that includes a barcode design that indicates a merchant under one embodiment.

FIG. 12 provides another example of an offer card or coupon 1200 that includes a barcode and associated graphical elements that identifies a merchant where the offer may be redeemed. Barcode 1202 is shaped to convey an image that is associated with a particular merchant and encodes an offer identifier. A numeric representation of the offer identifier is provided in offer code area 1206. A text area 1204 describes the offer.

Figure 13:
FIG. 13 is an example of a discount offer that includes a barcode design that indicates a department under one embodiment.

FIG. 13 provides an example of an offer card or coupon 1300 that includes a barcode 1302 and graphical elements 1312 that together convey an image that indicates a department within a merchant where the offer may be redeemed. As noted in the text area 1304, the offer of FIG. 13 is for $5.00 off a $50.00 purchase in a baby department. To better indicate to the user that the offer is for items in a baby department, barcode 1302 forms part of a graphical pattern 1310 that also includes a graphical element 1312. Barcode 1302 and graphical element 1312 together convey an image of a baby bottle. In the embodiment of FIG. 13, barcode 1302 is not altered from a standard block barcode. Instead, the position and appearance of graphical element 1312 relative to barcode 1302 is used to convey the image of the baby bottle. Barcode 1302 also encodes a numeric offer identifier that is listed in numeric form in offer code area 1306. A merchant identifier 1308 is also provided on offer 1300.

Under one embodiment, graphical element 1312 is printed with an ink that reflects the wavelengths of light used by a barcode scanner to read barcode 1302. Since the background of coupon 1300 also reflects these wavelengths of light, graphical element 1312 is sensed as being part of the background of coupon 1300 by the barcode scanner. Because of this, although graphical element 1312 is visibly distinct from the background of coupon 1300, graphical element 1312 does not interfere with the reading of barcode 1302 by the barcode scanner.

Figure 14:
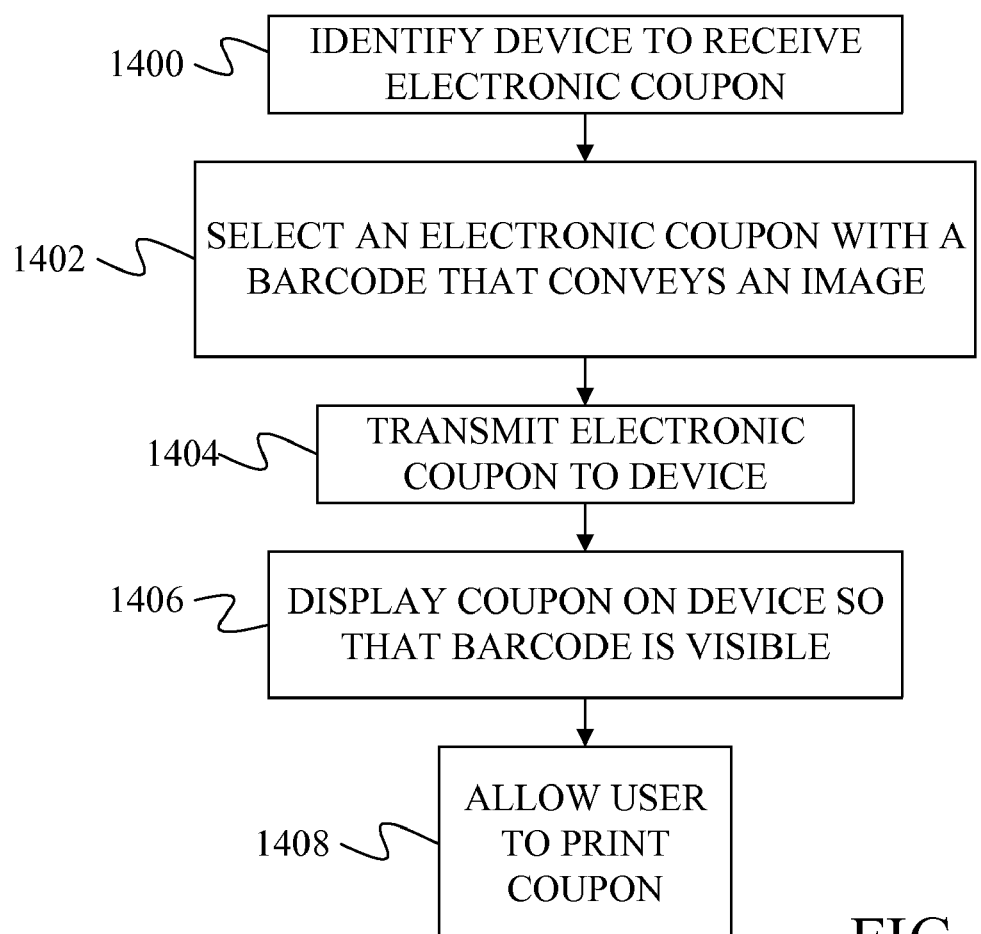
FIG. 14 provides a flow diagram for sending a coupon to an electronic device under one embodiment.

Coupons may also be sent electronically to consumers. FIG. 14 provides a flow diagram for sending a coupon with a barcode and associated graphical elements to an electronic device. In step 1400, a user device that is to receive the electronic coupon is identified. Example devices include portable devices such as cellular phones, personal digital assistance (PDA) and portable media players. Other electronic devices include desktop personal computers and appliances with computing devices built therein, such as refrigerators.

Based on the device that will receive the electronic coupon, an electronic coupon with a barcode and associated graphical elements that convey an image, such as an image associated with a merchant, department, event, season, theme, or product, for example, is selected at step 1402. At step 1404, the electronic coupon is transmitted to the user's device and at step 1406 the coupon is displayed on the user's device so that the barcode and associated graphical elements, if any, are viewable. At step 1408, an optional step is provided in which the user is allowed to print the coupon. By using a barcode that conveys an image, the present embodiment better utilizes the limited space found on many computing devices, such as cellular phones, PDAs, and portable media players. This allows users to more quickly determine whether they are interested in the electronic coupon thereby improving the chances that the consumer will actually redeem the coupon.

Figure 15:
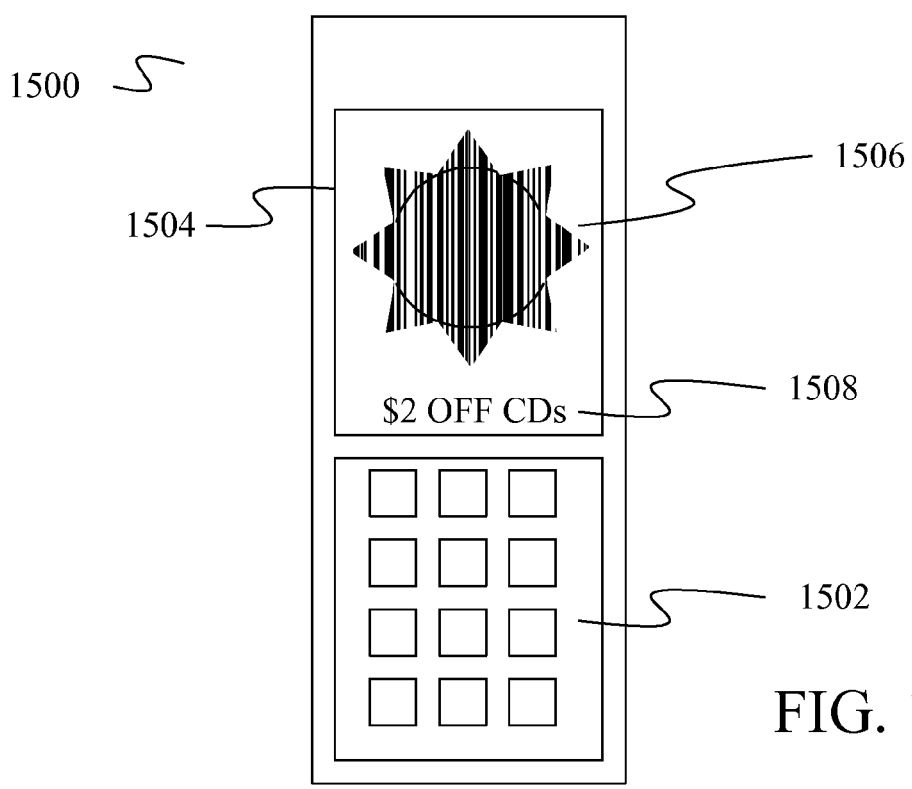
FIG. 15 is an example of a barcode design displayed on a portable computing device under one embodiment.

FIG. 15 provides an example of a portable computing device in which an electronic coupon is displayed. Device 1500 includes a keypad 1502 and a display 1504. On display 1504, an electronic coupon is displayed that includes a barcode 1506 that encodes an offer identifier and that is shaped to convey an image. The electronic coupon also includes a text offer area 1508 that describes the coupon offer. Electronic coupons may also be downloaded from websites on the internet by navigating to the websites and clicking on a link or control to download the electronic coupons.

Adding graphical elements to a barcode can make it difficult for a barcode reader to recognize the barcode. In particular, some graphical elements can be misinterpreted as being part of the barcode by the barcode reader and changes to the shape of the barcode can make it difficult for the barcode reader to read the entire barcode. In a retail setting, interference with reading a barcode is to be avoided since it increases the time needed to process a guest's purchases.

In addition, adding graphical elements to a barcode to convey an image can result in an image that contains intellectual property such as a Trademark, Service mark, Trade Dress or Copyright. To avoid later difficulties, it is desirable to evaluate the image conveyed by the graphical elements and the barcode before using the graphical elements and the barcode in a retail setting.

Thus, each set of graphical elements that are to be added to barcodes need to be tested to ensure that the barcode will scan well with the addition of the graphical elements. In addition, the image conveyed by the graphical elements and the barcodes must be evaluated to determine if the image represents intellectual property. This makes designing graphical elements for use with barcodes time-consuming and sometimes difficult.

Under one embodiment, to avoid having large numbers of people within an organization spending time to develop graphical elements that can be used with barcodes, a style sheet is created for an organization that provides examples of graphical elements that can be used with barcodes. These style sheets are made available to members of the organization so that they can quickly select graphical elements that meet their needs and that will allow a barcode to be scanned efficiently.

Figure 16:
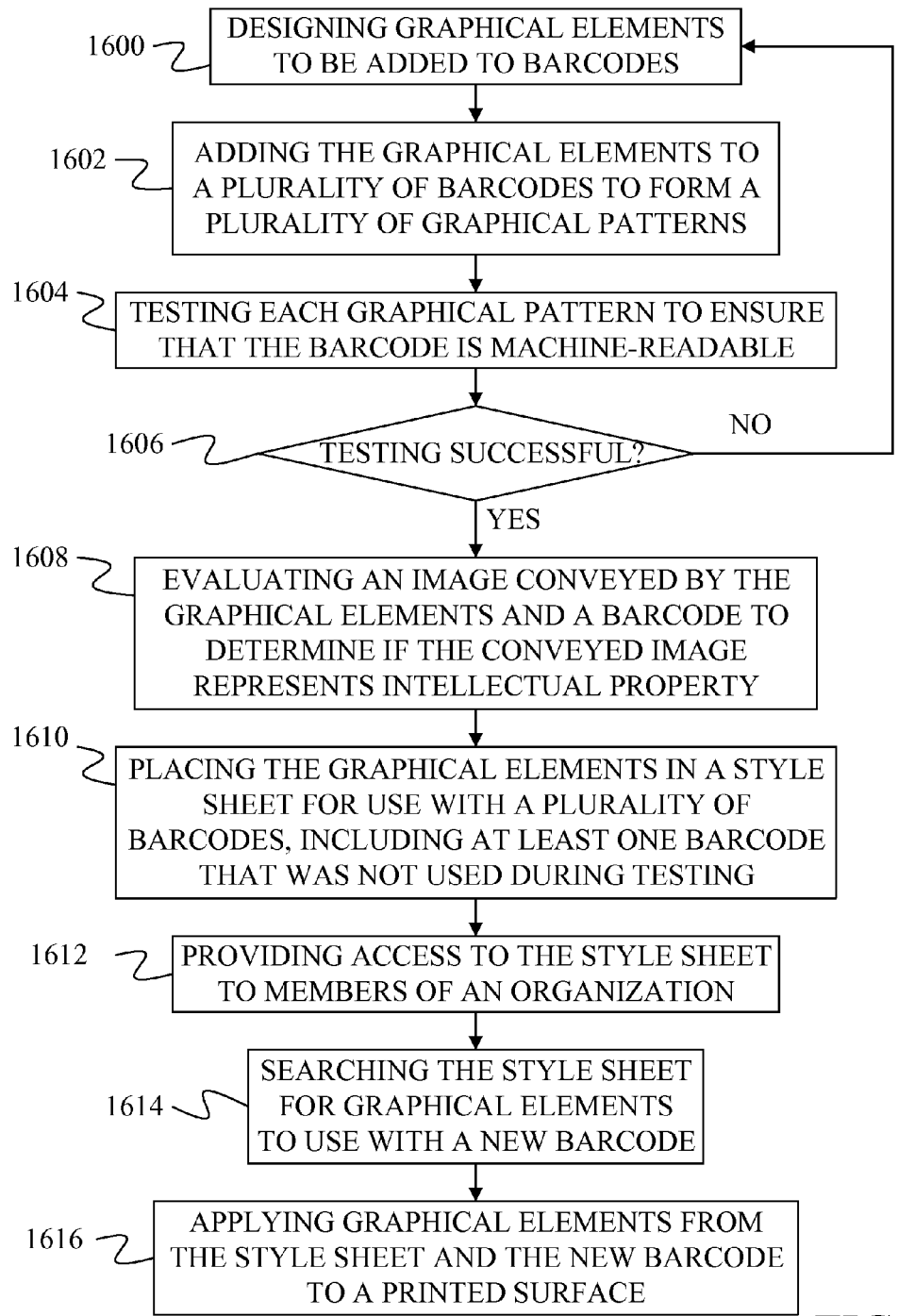
FIG. 16 is a flow diagram for forming and using style sheets under one embodiment.

FIG. 16 provides a flow diagram of a method for creating and using a style sheet of graphical elements that can be used with barcodes to convey an image. In step 1600, graphical elements to be added to barcodes are designed. The graphical elements are then added to a plurality of different barcodes to form a plurality of graphical patterns at step 1602. At step 1604, each of the graphical patterns is tested to ensure that each barcode is machine-readable after the addition of the graphical elements. Under some embodiments, each barcode must be recognized on a single pass of the scanner in order to be considered machine-readable. In other embodiments, a barcode will be considered machine-readable even if it is not recognized on a first pass of the scanner, as long as the barcode is eventually recognized by the scanner on a subsequent scan, for example.

By testing the graphical elements with multiple barcodes, this embodiment helps to ensure that the graphical elements can be used with any desired barcode without affecting the recognition of the barcode. Thus, through this testing, the embodiment establishes that other barcodes that have not been tested will likely also be machine-readable when used with the graphical elements.

At step 1606, a determination is made as to whether testing was successful. If the barcode was not machine-readable at step 1606, the process returns to step 1600 to redesign the graphical elements, change their position relative to the barcodes, or alter the color of the graphical elements. Steps 1602 and 1604 are then repeated for the redesigned graphical elements.

When graphical elements have been designed that allow the barcodes to be read by a scanner, the image conveyed by the combination of the graphical elements with a barcode is evaluated to determine if the image represents intellectual property such as Trademarks, Service marks, Trade Dress, and Copyrights. After the image has been evaluated and is cleared for use, the graphical elements are placed in a style sheet at step 1610 for use with a plurality of barcodes, including at least one barcode that was not used during testing.

A style sheet indicates the size and appearance of the graphical elements, the colors of the graphical elements, and the positioning of the graphical elements relative to the barcode. For example, under one embodiment, the style sheet indicates that a graphical element must be positioned at least ¾ of an inch to the left of the beginning of the barcode. In another embodiment, the style sheet indicates that a graphical element must be positioned at least ¾ of an inch to the right of the end of the barcode. In some embodiments, the style sheet also indicates the space that the barcode is to occupy relative to the graphical elements. A single style sheet may be provided for all graphical elements that are to be used with barcodes or different style sheets may be provided for different types of graphical elements.

At step 1612, access to the style sheet is provided to members of an organization. For example, access to the style sheet may be provided to employees of a corporation or to the design staff of a corporation.

At step 1614, the style sheet is searched for graphical elements to use with a new barcode. At step 1616, the graphical elements form the style sheet and the new barcode are applied to a printed surface such as a product, coupon, receipt, gift card, for example, in accordance with the parameters set in the style sheet for the color, size and positioning of the graphical elements relative to the barcode.

Although references are made above to barcodes, those skilled in the art will recognize that any graphical patterns that encode information may be used in any of the embodiments discussed above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   generating a purchaser receipt graphical pattern that encodes a transaction identifier;
   printing the purchaser receipt graphical pattern on a purchaser receipt;
   generating a gift receipt graphical pattern that encodes the transaction identifier and that conveys an image that distinguishes the gift receipt graphical pattern from the purchaser receipt graphical pattern; and
   printing the gift receipt graphical pattern on a gift receipt.

2. The method of claim 1 wherein generating a purchaser receipt graphical pattern comprises generating a purchaser receipt graphical pattern that conveys an image associated with a merchant.

3. The method of claim 1 wherein generating the gift receipt graphical pattern comprises dynamically modifying pattern elements to convey the image.

4. The method of claim 3 wherein generating the gift receipt graphical pattern comprises adding additional graphical elements to barcode elements to convey the image.

5. The method of claim 1 further comprising:
   generating a marketing receipt graphical pattern that encodes an offer identifier and that conveys an image;
   printing the marketing receipt graphical pattern on a marketing receipt coupon.

6. The method of claim 5 wherein the marketing receipt graphical pattern conveys an image associated with one of a group comprising: a merchant, a department, an event, a season, a theme, and a product.

7. The method of claim 5 wherein printing the marketing receipt graphical pattern comprises printing the marketing receipt graphical pattern based on image data representing the marketing receipt graphical pattern while preventing a font-based barcode from printing on the marketing receipt coupon.

8. The method of claim 7 wherein printing the marketing receipt graphical pattern based on image data comprises printing the marketing receipt graphical pattern in an image area of the marketing receipt and preventing the font-based barcode from printing in a font-based barcode area of the marketing receipt.

9. Transaction-related documentation comprising a purchaser receipt comprising:
- a list of records of items involved in a transaction; and
- a purchaser barcode that encodes a transaction identifier and that conveys at least part of an image, the transaction-related documentation further comprising a gift receipt comprising:
- a list of records of items involved in a transaction; and
- a gift receipt barcode that encodes the transaction identifier and that conveys at least part of an image that differentiates the gift receipt from the purchaser receipt.

10. The transaction-related documentation of claim 9 further comprising a marketing receipt coupon that provides an offer to a consumer, the marketing receipt coupon comprising an offer barcode that encodes an offer identifier and that conveys an image.

11. A method comprising:
- identifying a coupon to be printed on a marketing receipt;
- determining that image data for a barcode is available;
- printing the barcode on the marketing receipt based on the image data; and
- preventing printing of a font-based barcode on the marketing receipt.

12. The method of claim 11 wherein printing the barcode comprises printing the barcode in an image area on the marketing receipt and wherein preventing printing of a font-based barcode comprises preventing printing of the font-based barcode in a font-based barcode area.

13. The method of claim 11 wherein printing the barcode comprises printing a barcode that encodes an offer identifier associated with the coupon and that conveys an image.

14. The method of claim 13 wherein the barcode conveys an image associated with one of a group consisting of: a merchant, a department, an event, a season, a theme, and a product.

* * * * *